Jan. 13, 1970        P. J. MORCOM        3,489,374
AIR-GROUND VEHICLE
Filed March 25, 1968                            9 Sheets-Sheet 1
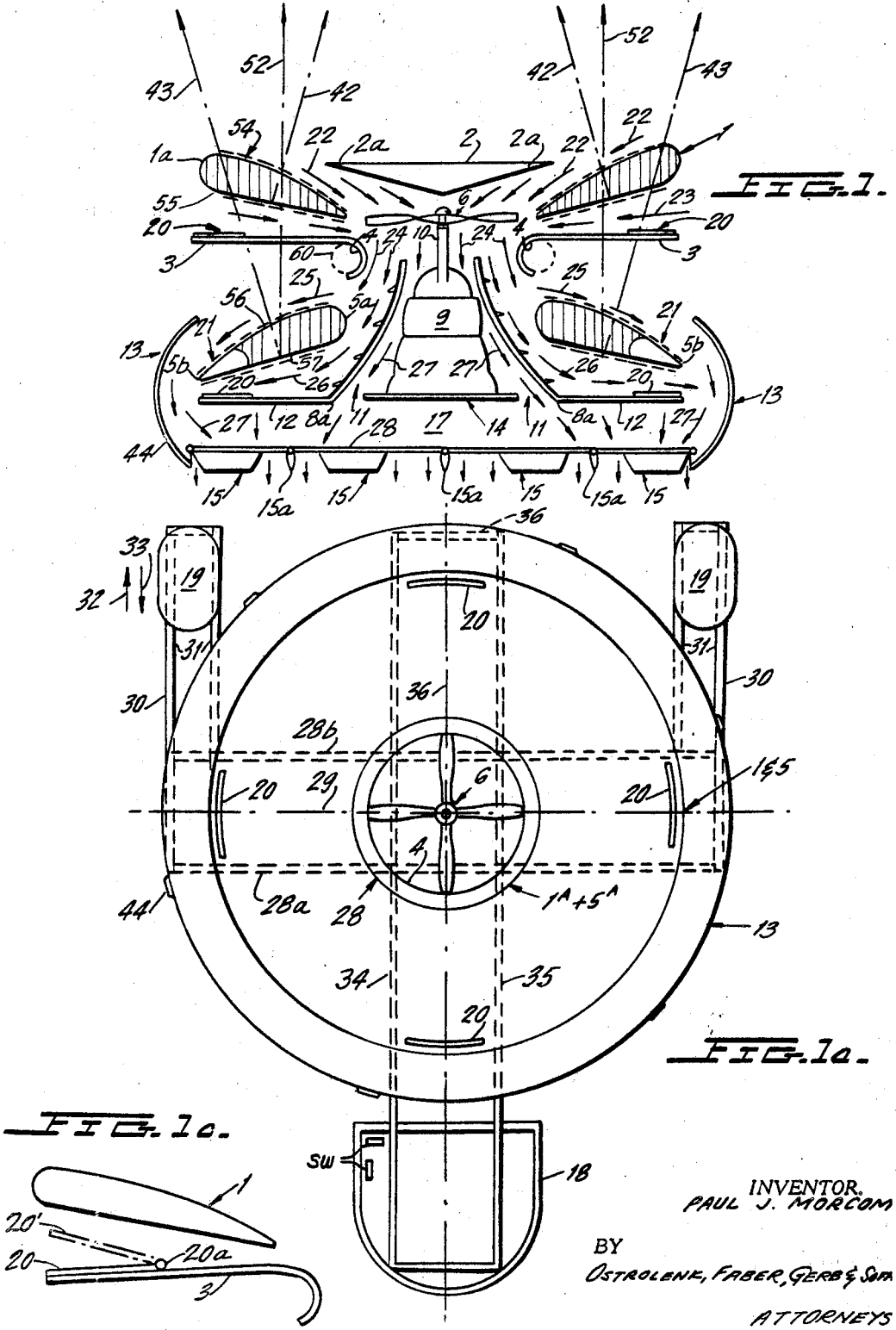
INVENTOR.
PAUL J. MORCOM
BY
OSTROLENK, FABER, GERB & SOFFEN
ATTORNEYS

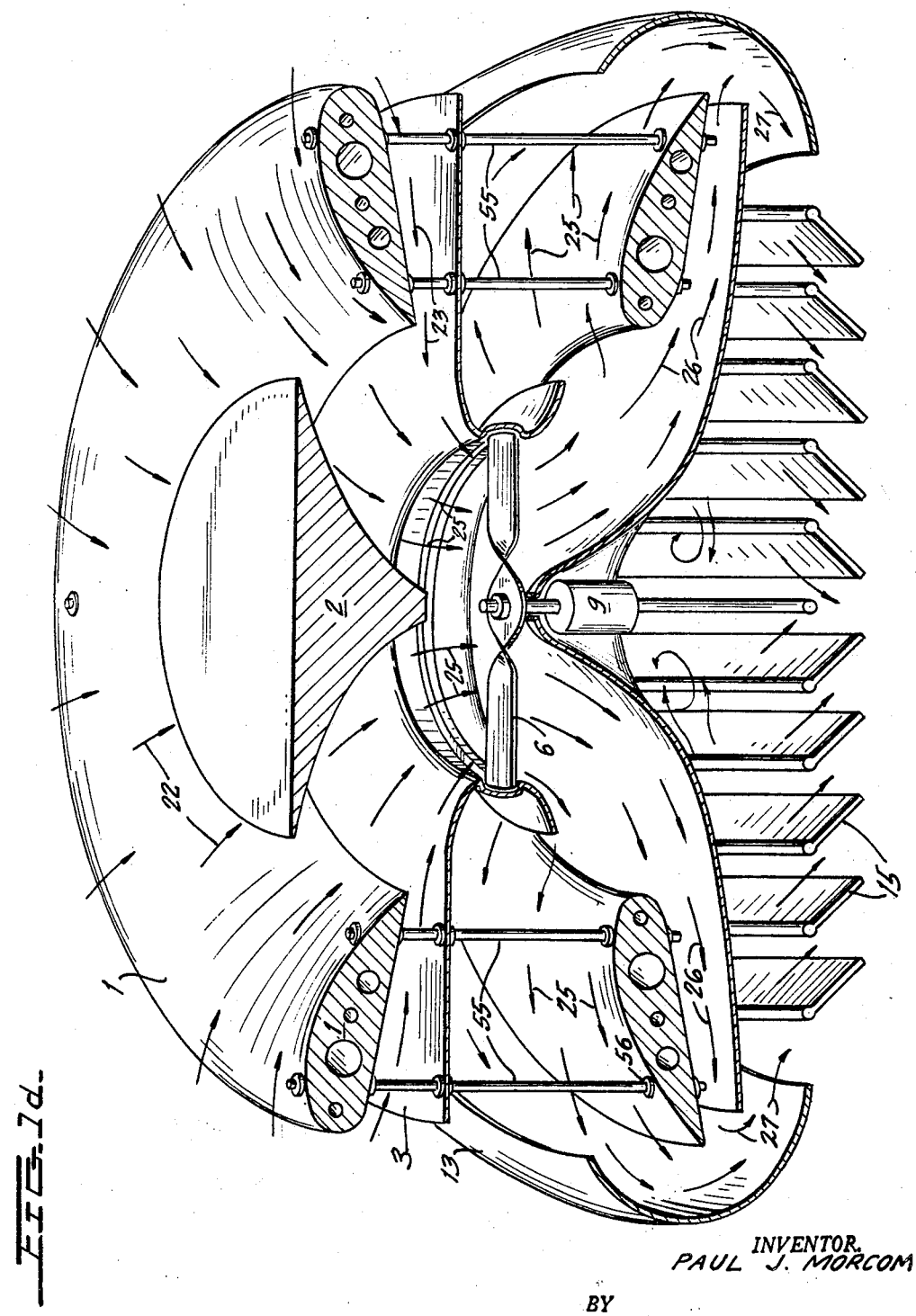

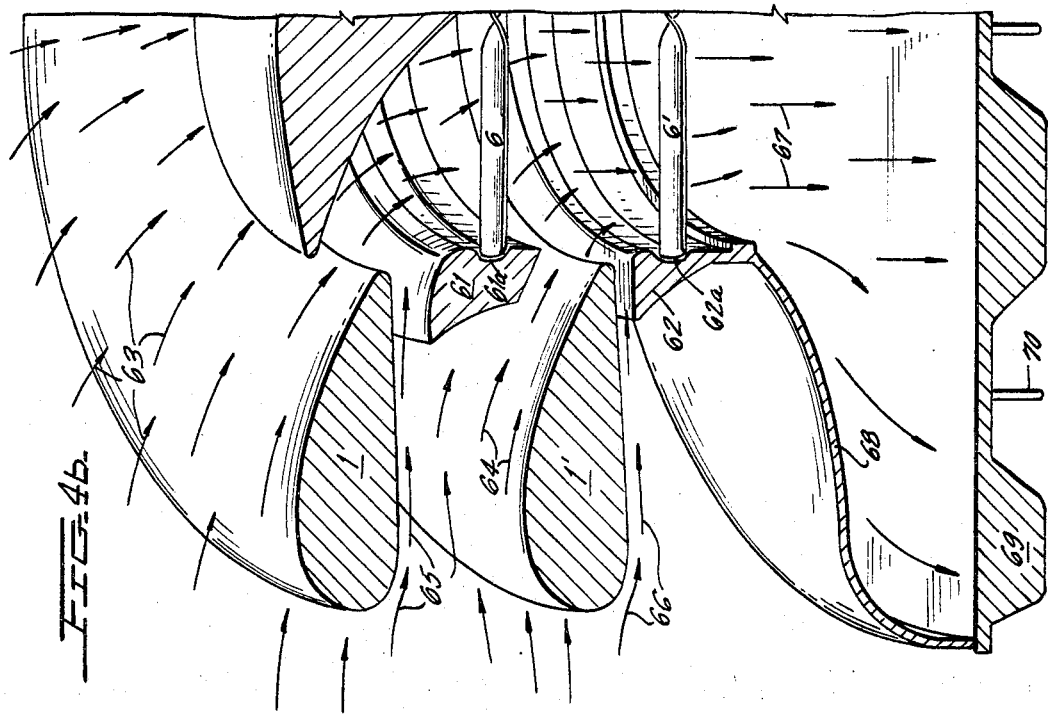
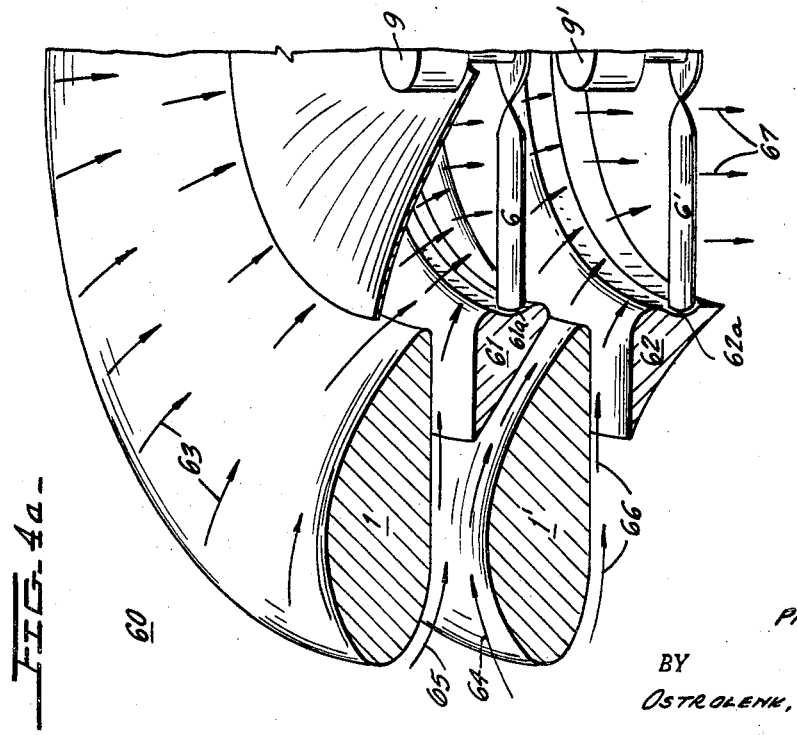

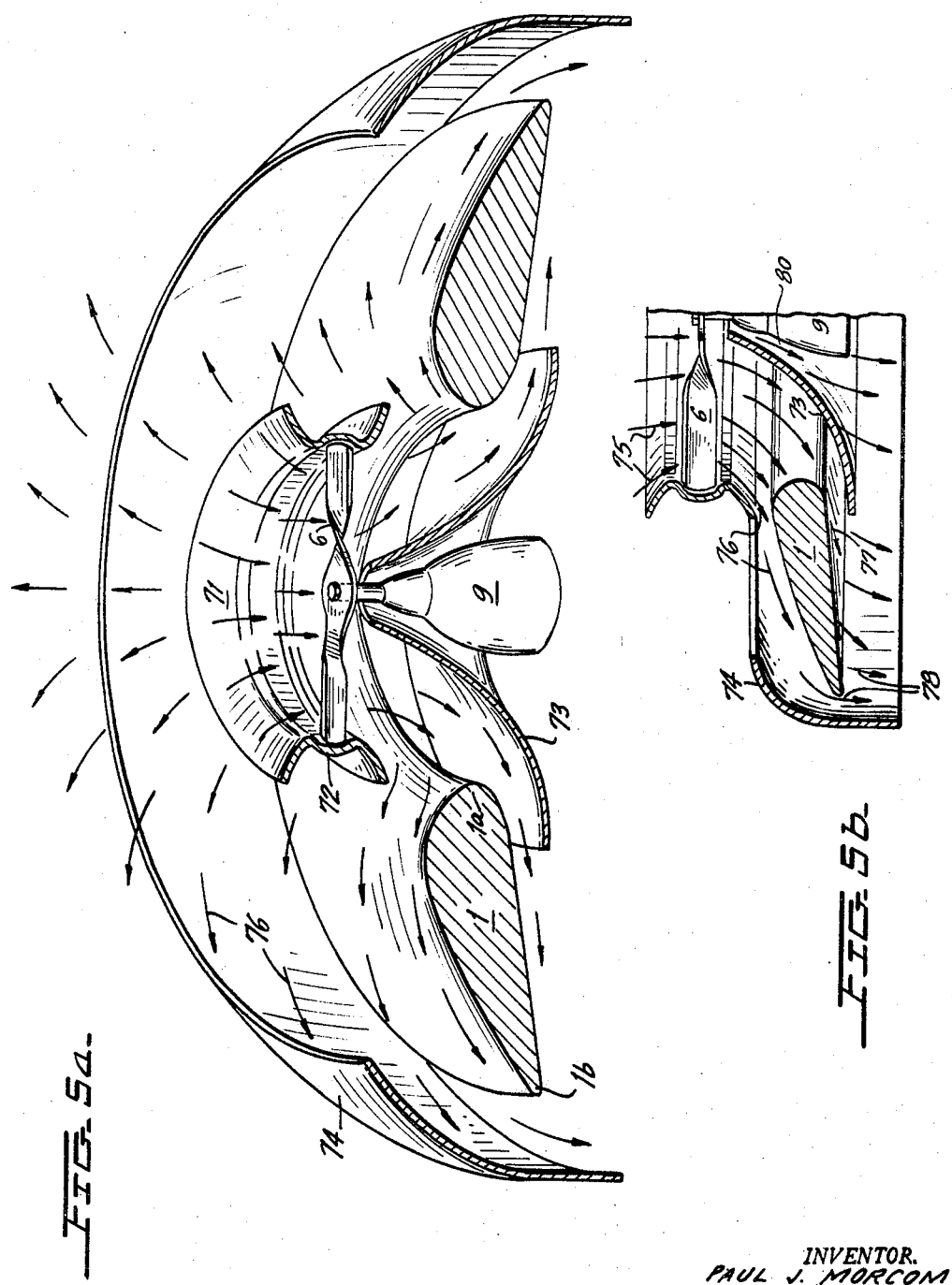

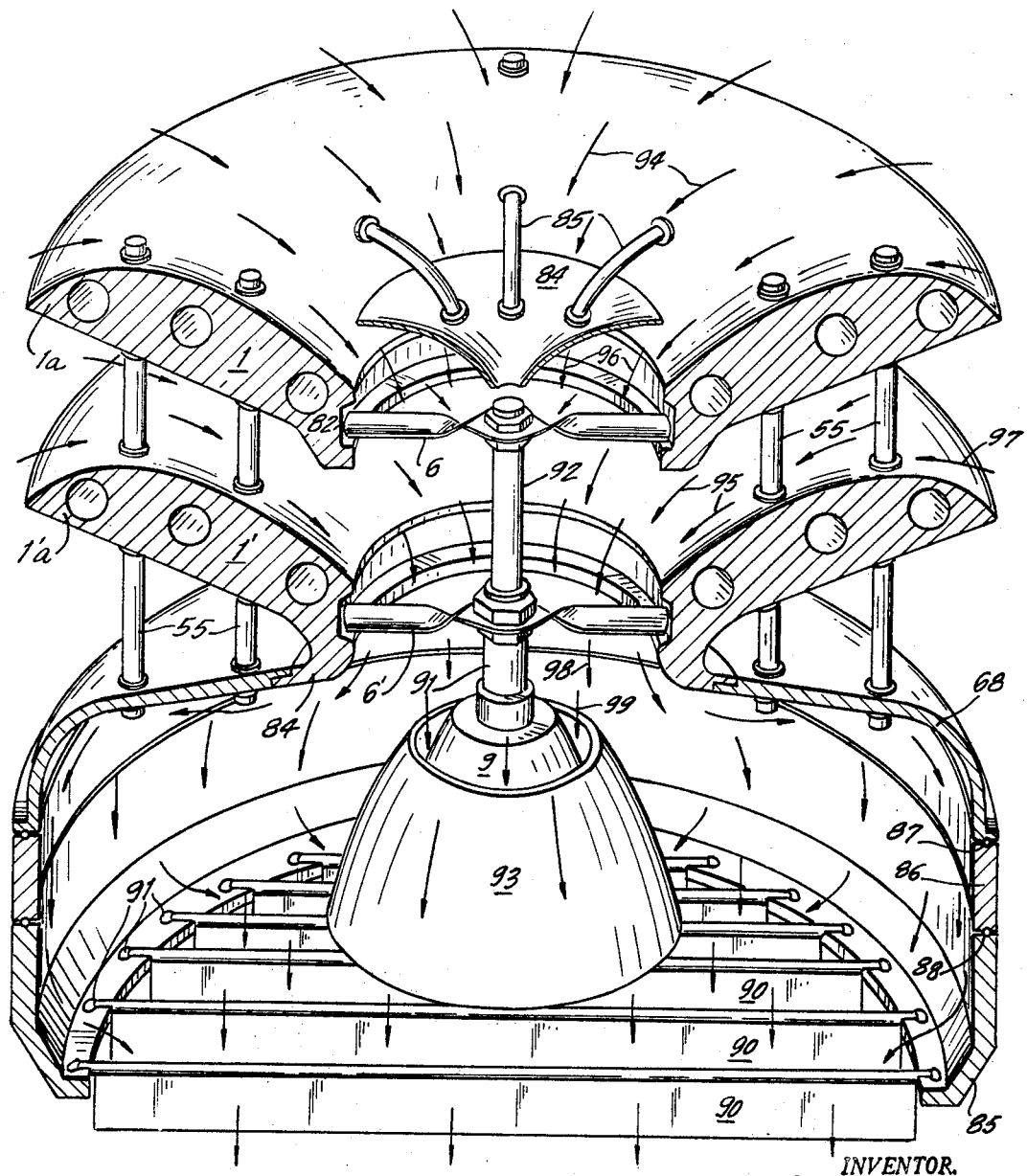

Jan. 13, 1970  P. J. MORCOM  3,489,374
AIR-GROUND VEHICLE

Filed March 25, 1968  9 Sheets-Sheet 7

INVENTOR.
PAUL J. MORCOM

BY

OSTROLENK, FABER, GERB & SOFFEN
ATTORNEYS

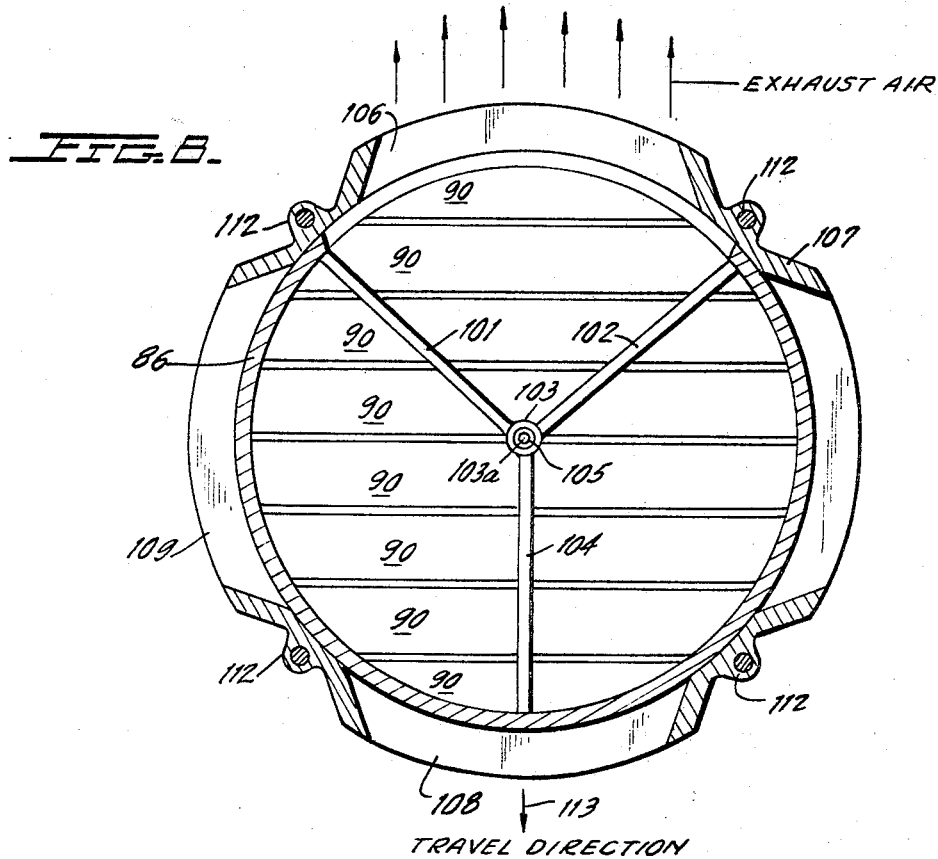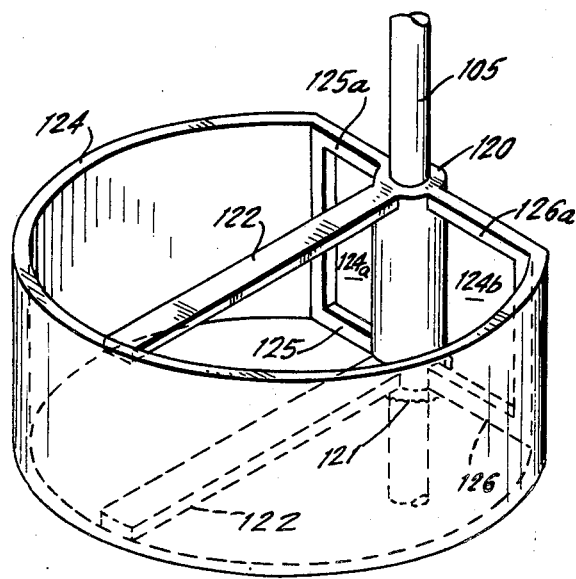

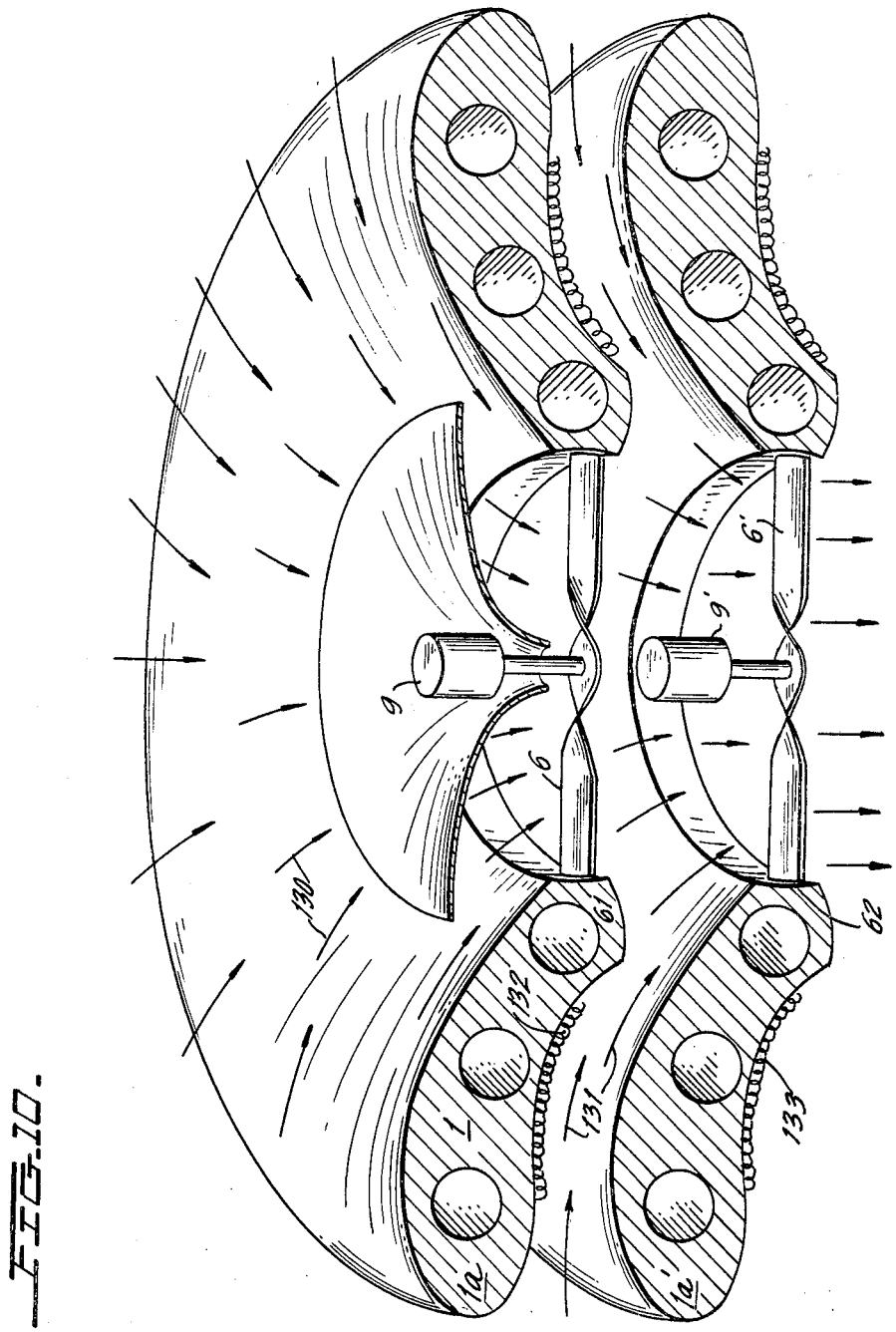

United States Patent Office 3,489,374
Patented Jan. 13, 1970

3,489,374
AIR-GROUND VEHICLE
Paul J. Morcom, 1203 Slaydon,
Henderson, Tex. 75652
Filed Mar. 25, 1968, Ser. No. 715,706
Int. Cl. B64c 15/00, 29/00
U.S. Cl. 244—12
15 Claims

ABSTRACT OF THE DISCLOSURE

This invention teaches a combined air-ground vehicle comprised of first and second annular-shaped wings, or other wing-like structure, arranged one above the other and in a concentric fashion wherein each wing is so aligned as to have a build-in angle of attack. The angles of attack are complementary relative to one another so as to develop a lift which is directed vertically upward. The driving means is preferably a propeller means mounted in a central region between the wing structures, and which operate so as to cause the air to be drawn inwardly from the upward outer end of the structure so as to pass the upper mounted wing and impart a lift, and then subsequently to be driven from the central region outwardly to pass the lower wing structure and impart a second lift. Deflector means are provided for collecting all of the downward flowing air which is controlled by airflow control levers to control the upward or sideward movement of the craft. Balancing of the air-ground vehicle is provided for by linearly movable counterweights and further by spoilers located in suitable platform ducts so as to properly trim the aircraft.

A portion of the incoming air passing the upper wing structure is diverted to pass over the engine for cooling purposes. The cockpit area is positioned off to one side of the assembly along a radial line thereof and at a side of the assembly opposite said movable counterweights. The trim operation may be performed automatically by microswitch means operating the spoiler means and counterweights as a result of any shift in the balance of the air-ground vehicle.

---

The instant invention relates to air-ground vehicles, and more particularly to a novel air-ground vehicle employing substantially annular-shaped wing sections which are aligned so as to have built-in angles of attack and which provide lift complementary to one another so as to provide a resultant upward thrust to the vehicle and which further comprises means for directing airflow exhausted from the vehicle for the purpose of moving the vehicle either up or down and/or in a sidewise direction.

Ever increasing demands have been imposed upon the transportation industry to the point where the transportation industry has fallen behind such demands and their fulfillment. One every present requirement has been the need for a vehicle capable of use as both airborne and ground transportation especially insofar as transportation of one or two people are concerned. Whereas it may be desired to provide relatively high-speed transportation, certain terrain does not lend itself to such high-speed travel. For example, congested areas, forests and rugged terrain, as well as bodies of water, limit the types of vehicles which can presently be used to traverse such regions.

The instant invention contemplates a combined air-ground vehicle capable of being airborne and of traversing terrain at any altitude necessary to overcome the natural obstacles of such terrain, or any other altitude, altitude governed only by incorporated equipment such as pressurization. The vehicle contemplated by the instant invention may be flown at either high or low altitudes using a single driving source for the purpose of propelling the vehicle, and is further capable of hovering as well.

The instant invention is comprised of a pair of annular or discold-shaped wings arranged one above the other and positioned so as to have a fixed angle of incidence attack. The wings, in addition to being arranged one above the other are substantially concentric about a vertical axis of the vehicle. The driving means consisting of a propeller driven by an engine is mounted in the central region between the wings, and is designed to pull air inwardly toward the driving means, causing the air to pass the upper wing structure imparting a lift to the vehicle. The air is then directed downward, a small portion of which is deflected to pass over the engine for cooling purposes. The major portion of the air is caused to pass the lower wing structure which imparts a second lift to the vehicle offset at an angle relative to the lift imparted by the upper wing structure so as to yield a resultant lift which is directed substantially vertically upward.

The air passing the lower wing structure is deflected so as to be directed either in a sidewise direction and/or a downward direction for the purpose of imparting sidewise and/or upward movement to the vehicle, depending upon the particular movement desired by the operator.

The vehicle cockpit is positioned to one side of the assembly. An assembly comprised of movable counterweights and tracks to move the counterweights are provided and are arranged on the one side of a center line of the wing structure. The cockpit is arranged to the opposite side of the center line to provide basically good balance for the structure. The weights are movable and preferably under control of the operator to provide the necessary trim for the vehicle. In addition thereto, spoilers are arranged within the deflecting ductwork of the vehicle, which ductwork is employed for the purpose of controlling the passage of air through the vehicle. The spoilers provide additional trim, and electronic means may be employed to automatically cause a spoiler or spoilers to be pivoted to the open position in order to provide their trimming function.

Pivotally mounted louvers are provided for guiding the direction of flow of air sidewise and/or downwardly for the purpose of controlling direction of movement of the vehicle.

Anti-torque vanes are provided along the ductwork for the purpose of reversing air flow. As an alternative, a two-propeller or counter-rotating system may be employed for overcoming torque phenomenon.

If true ground transportation in the normal sense of the term is desired, the engine may be coupled to a suitable gearing system which, in turn, may be coupled to wheels provided along the underside of the vehicle for operating truly as a ground vehicle in the conventional sense. If desired, floatation gear may be provided.

The ductwork is further comprised of a duct at the uppermost top-center for deflecting inwardly moving air and may further be provided with a parachute which may be automatically released and opened to cause the vehicle to drop safely to the ground in case of emergencies.

It, is therefore, one object of the instant invention to provide a novel air-ground vehicle for use in combined air-ground travel which is comprised of first and second annular-shaped wings.

Another object of the instant invention is to provide a novel air-ground vehicle for use in combined air-ground travel which is comprised of first and second annular-shaped wings wherein the wings are arranged one above the other and in a substantially concentric fashion to develop counterbalancing thrusts which provide a resultant thrust which is directed vertically upward.

Still another object of the instant invention is to provide a novel air-ground vehicle for use in combined air-ground travel which is comprised of first and second annular-shaped wings wherein the wings are arranged one above the other and in a substantially concentric fashion to develop counterbalancing thrusts which provide a resultant thrust or lift which is directed vertically upward and which is further comprised of a cockpit and movably mounted counterweight means respectively arranged about the center line of the wing assembly for the purpose of providing and simplifying front-to-back trim.

Still another object of the instant invention is to provide a novel air-ground vehicle for use in combined air-ground travel which is comprised of first and second annular-shaped wings wherein the wings are arranged one above the other and in a substantially concentric fashion to develop counterbalancing thrusts which provide a resultant thrust which is directed vertically upward and which is further comprised of a cockpit and movably mounted counterweight means respectively arranged about the center line of the wing assembly for the purpose of providing and simplifying front-to-back trim and wherein the assembly is further comprised of ductwork and pivotally mounted deflectors for controlling the direction of flow of air through the wing assembly and as it leaves the vehicle so as to provide vertical and/or sidewise movement thereof.

These as well as other objects will become apparent when reading the accompanying description and drawings in which:

FIGURE 1 is a sectional elevational view showing the wing driver and ductwork assembly of an air-ground vehicle designed in accordance with the principles of the instant invention;

FIGURE 1a is a top plan view of the air-ground vehicle of FIGURE 1;

FIGURE 1b is another elevational view of the air-ground vehicle of FIGURES 1 and 1a;

FIGURE 1c is an end view showing one spoiler arrangement of the air-ground vehicle in detail;

FIGURE 1d is a perspective view of the embodiment of FIGURE 1.

FIGURES 4a and 4b are perspective views of alternative embodiments for the propeller arrangement of FIGURE 2.

FIGURE 5a shows a perspective view partially sectionalized of still another alternative embodiment of the present invention employing a single propeller drive.

FIGURE 5b shows a partially sectionalized elevational view of the embodiment of FIGURE 5a.

FIGURE 6 shows a perspective view of still another preferred embodiment of the present invention employing a dual propeller drive.

FIGURES 8 and 9 are top plan and perspective views, respectively, showing an air dispersal selector ring assembly which may be employed in the embodiments of FIGURES 6 and 7, for example.

FIGURE 10 shows a perspective view of still another alternative embodiment of the present invention employing a twin propeller drive.

Figure 1B:
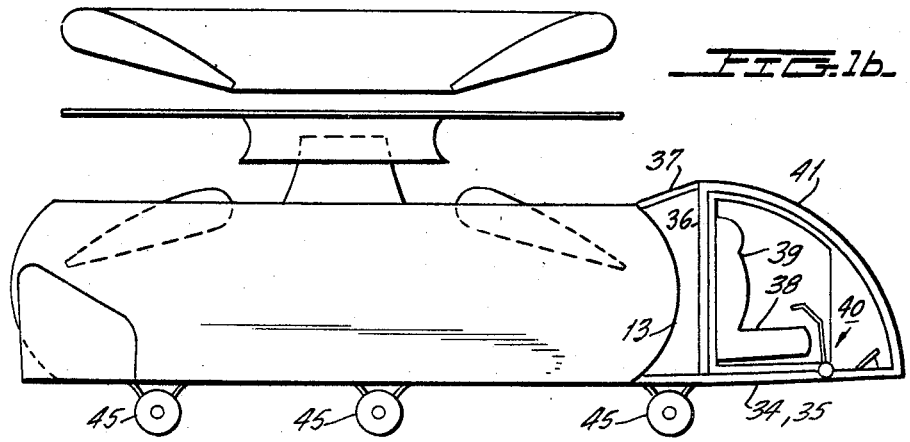

Referring now to the drawings, and more particularly to FIGURES 1–1d, there is shown therein an air-ground vehicle designed in accordance with the principles of the instant invention which is comprised of an upper substantially annular-shaped wing 1. The outer periphery 1a of the wing constitutes its leading edge and the inner periphery 1b constitutes its trailing edge. A second annular-shaped wing 5 is positioned below wing 1 and has its leading edge at its inner periphery 5a and its trailing edge at its outer periphery 5b. As can best be seen in FIGURE 1, each of the wings has a fixed angle of attack relative to the horizontal with the lift or thrust line of each wing being aligned at angles offset on opposite sides from a vertical line in order to provide a novel lift feature in a manner to be more fully described.

The engine 9 of the vehicle is vertically aligned, and is positioned in the central region between the inner openings of the wings 1 and 5. The engine may be of the piston type or alternatively, may be a jet engine or any other suitable engine which is capable of rotating an output shaft 10 about its longitudinal axis which is colinear with the vertical axis of the vehicle, as designated by the line A. A propeller 6 is secured to shaft 10 by any suitable means, and is caused to rotate by motor 9 so as to pull air inwardly from an outwardly direction in the direction shown by arrows 22 and 23 for air respectively passing above and below the annular-shaped wing 1. A center duct platform 3 which is a substantially flat annular-shaped member has a central opening formed by its inner flanged portion 4 which curves around and down and outward to guide the inwardly flowing air toward the center line A so as to cause the air to move generally in a downward vertical direction. A toroidal-shaped fuel tank 60 of circular cross-section may be provided immediately behind flange 4. It should be noted that a variety of different methods can be employed for providing propulsive power. For example, the engine may be a gimbaled secondary drive engine having a pusher or puller propeller, obviously aligned in the appropriate direction. As another alternative, a stationary secondary drive engine with a pusher or puller propeller may be employed, together with a rudder assembly provided in the airflow exhaust. Still further means may be provided for deflecting or diverting expulsed air as it leaves the region of the propeller. As a further alternative, a combination of diversion and vaning techniques may be employed.

The downwardly directed airflow, as shown by the arrows 24, is caused to be deflected generally in the outward direction, as shown by arrows 25 and 26, indicating that the air passes respectively above and below the annular-shaped wing 5. The air in the region designated by the arrows 24 is caused to be deflected outwardly by the conical-shaped engine shield 8. The upper end of the shield is open in order to allow some of the downward airflow to enter into the region of the engine 9 and pass downwardly and outwardly, as shown by arrows 27, in order to pass over engine 9 and thereby serve as a cooling means for the engine.

The annular solt 4a formed in flange 4 provides clearance for the distal ends of the blades of propeller 6 and, more importantly, cancels any back pressure in the upward direction to thereby prevent any significant reduction in lift.

The conical-shaped engine shield 8 curves outwardly from top to bottom, and its bottom portion at 8a is flared outwardly in a horizontal manner to form a bottom duct platform portion 12 which functions, together with the conical-shaped portion 8, to direct the air, shown by arrows 26, passing above and beneath lower wing 5 in an outward direction.

An annular-shaped member 13 having a curvilinear cross-section is arranged to surround lower wing 5, and causes the air passing above and below lower wing 5 to curve downwardly, as shown by arrows 27, so as to be deflected to enter into an air-collection chamber 17 which, in addition to collecting the air deflected downwardly and slightly inwardly by the exhaust scoop air-collector 13, collects the air passing downwardly, as shown by arrows 27, through the region between engine 9 and engine shield 8.

The bottom of the air-collection chamber 17 is defined by a circular-shaped base plate 28 having a plurality of openings (not shown). Each of the openings has associated therewith a pivotally mounted airflow control louver. The louvers are positioned over substantially the entire region of the base plate 28, and are arranged perpendicular to one another such that a portion of the louvers 15a are pivotally mounted in a manner so as to be perpendicular to the remaining pivotally mounted louvers 15, as can best be seen in FIGURE 1.

The central opening at the top of the air-ground vehicle is partially blocked by an air-block plate 2 which forms one part of a circular-shaped housing having a triangular cross-section with the remaining wall of the housing being defined by a conicalshaped member 2a which cooperates with the upper edge of upper wing 1 to cause the inwardly flowing air to be directed toward the center of the structure into the region occupied by propeller 6.

The aircraft has a substantially U-shaped supporting structure 28 having a central portion 28a whose longitudinal axis 29 (see FIG. 1a) is coincident with one diameter of the assembly. The U-shaped supporting structure has a pair of arms 30 extending upwardly from the central portion 28a relative to FIGURE 1a. The arms 30 are each provided with a pair of tracks 31 which slidably receive an associated trim counterweight 19 which rides in its associated pair of tracks. Each of the weights are movable along the tracks in either of the two directions shown by arrows 32 and 33, respectively, for the purpose of balancing the craft in a manner to be more fully described.

The supporting structure of the vehicle is further comprised of a pair of elongated supporting ribs 34 and 35 which are arranged in spaced parallel fashion on opposite sides of phantom line 36 which is coincident with another major diameter of the vehicle which is perpendicular to the phantom line 29, coincident with a major diameter of the vehicle previously mentioned. The upward ends of the supporting ribs 34 and 35 relative to FIG. 1a are secured by a cross-brace 28a–28b and the lower ends thereof support a cockpit assembly 18, a side view of which can best be seen in FIGURE 1b. The base or floor of the cockpit assembly 18 rests upon the supporting ribs 34 and 35. The rear wall 3 thereof is braced at its upper end by a bracing member 37 whose opposite end is secured to an upper edge of the exhaust scoop air-collector member 13. The cockpit area is provided with a seat 38 having a backrest 39. Suitable controls, shown generally by the numeral 40, are provided therein within easy reach of the pilot. The enclosure of the cockpit is preferably a transparent bubble canopy 41 having a portion thereof (not shown) either pivotally mounted to constitute a door or slidably mounted to an opening for gaining access to the cockpit area.

The operation of the air-ground vehicle is as follows:

The engine 9 is started, causing its output shaft 10 to rotate about its longitudinal axis which is coincident with the vertical axis A. Shaft 10 causes the propeller 6 to rotate. The pitch of the propeller is selected so as to cause the propeller to pull air inwardly toward the center of the vehicle both above and below the annular-shaped wing 1 generally in the direction as shown by arrows 22 and 23, respectively. The downwardly travelling air which moves over the top surface of the upper wing 1, due to the shape of the airfoil 1, creates a lift or upper thrust, as shown by the thrust vectors 42, 42. Actually, since the wing is a continuous annular-shaped member, this thrust line extends 360° around the entire wing, and can be considered to be a conical-shaped thrust line.

After the air has passed the upper wing 1, it enters into the region of the propeller and is in a state of great turbulence. The direction of the airflow which is moving generally downwardly and inwardly and in a circular motion is reversed to reverse circular flow to compensate for the torque of the engine 9. Some of the airflow passes downwardly, as shown by arrows 24, to enter into the opening 7 of the exterior engine cone 8 which forms an engine-cooling intake duct. The air passing therethrough flows downwardly generally in the direction shown by arrows 27 for the purpose of cooling the engine. A small portion of the downward airflow, as shown by arrows 27, passes through the opening formed between the engine base plate 14 and the exterior engine cone 8 so as to cool the engine and then enter into the air-collection chamber 17.

The balance and actually the major portion of inwardly and downwardly flowing air passes the upper and lower surfaces of bottom wing 5. Due to its airfoil shape, the passing air creates a lift upon annular-shaped wing 5 which is identified by the thrust vector 43, 43. Since bottom wing 5 is a continuous annular-shaped member, the thrust line is actually a continuous line 360° about the wing which may be considered to be conical-shaped tapering outwardly, as shown by the vector lines of force 43, 43 of FIGURE 1.

The air passing the trailing edge of lower wing 5 is prevented from escaping from the vehicle into the atmosphere, due to the presence of the exhaust scoop air collector 13. This plate encircles the entire craft and causes the air to be channeled downwardly in the direction shown by arrows 27, 27 so as to enter into the air-collection chamber 17. The air collected in chamber 17 is deflected in a front-to-back o side-to-side flow for directional control, or is permitted to exit in a downward vertical fashion for further enhancement of the lift of the aircraft. The air passes through the openings (not shown) in which each of the pivotally mounted louvers 15 and 15a are located.

Front-to-rear trim of the craft is carried out by means of the movable trim counterweights 19 in order to compensate for the cockpit loading weight differentials. The weights 19 ride in their associated tracks 31 and are preferably coupled into the cockpit area by suitable cables (not shown) coupled into a cockpit control member (not shown) so as to balance the craft front-to-rear. Since the weights 19, 19 and the cockpit 18 are positioned through opposite sides of the center line or major diameter 29, the front-to-rear trim may be carried out very simply and quickly. If desired, the counterweights may be independently operated so as to provide left-to-right trim relative to the arrangement of FIGURE 1a.

Further trim of the aircraft may be governed by use of the spoilers which are pivotally mounted to the platform portions 3 and 13 of the duct assembly. The spoilers are designated by the numeral 20 which can best be seen in FIGURE 1. The spoiler action is shown in detailed fashion in FIGURE 1c, wherein a portion of the upper duct platform 3 is reproduced showing a spoiler member 20 in solid line fashion pivotally mounted at 20a to platform 3. The spoilers, which are long, narrow plates arranged along the platforms, are lifted from the solid line position 20 of FIGURE 1c to the dotted line position 21' of the same figure for the purpose of reducing lift and increasing the drag of the vehicle. The spoilers are shown mounted at 90° intervals, as can best be seen in FIGURE 1a, and may be independently operated relative to one another for the purpose of providing either front-to-rear or left-to-right trim. If desired, additional spoilers may be provided located at positions intermediate the spoilers shown in FIGURE 1a. For example, four additional spoilers may be provided on the upper and lower platform ducts 3 and 12, respectively, spaced at 45° angles around each of their associated platforms, rather than at 90° angles, as is shown in FIGURE 1a. The spoilers may be automatically actuated by attitude-sensitive switch means such as tilt-type mercury switches which are sensitive to a shift in weight. The mercury switches SW may be mounted in the cockpit portion 18 of the vehicle, as shown in FIGURE 1a, and may operate the spoilers through mechanical means (not shown) in accordance with the operation of the tilt-type mercury switches. Switches which are suitable for use may be those sold by the Gordos Corporation such as, for example, model No. HG424LO or HG772LO. For example, if the weight forward becomes greater than the weight rearward for whatever reason, the forward section of the craft will be lower relative to the rearward section. This lowering can actuate the attitude-sensitive microswitches at the rear portion of the craft to open the spoilers located at the rear, and thereby decrease the lift of the rear section of both annular wings. Upon reaching a level condition or attitude, the attitude-sensing switches will become deenergized and cause the spoilers to remain in the adjusted position until the attitude of the craft again changes with respect to the horizontal and thereby requires further actuation.

To counteract the torque developed by the engine, either of two arrangements are envisaged. As a first arrangement, the craft may be provided with a plurality of diffuser nozzles 44 arranged peripherally around the exhaust scoop air-collector 13. FIGURE 1 shows one such nozzle 44, and FIGURE 1a shows six such nozzles equally spaced around the periphery of scoop 13 which may be operated independently of one another for the purpose of counteracting torques.

As an alternative embodiment, the exterior engine cone 8 may be provided with a plurality of anti-torque vanes 16 for the purpose of reversing airflow. The vanes extend outwardly at an angle from engine cone 8 and cause the air to be deflected outwardly and in opposing direction of prop rotation, as shown by the arrows 25 and 26, for the purpose of passing both the upper and lower surfaces of lower wing 5.

The air-block plate 2, in addition to blocking off overheat intake of air and causing the flow of inward air to enter a passageway formed between its lower surface 2a and the upper surface of wing 1, enhances the lift provided by the upper wing 1. The closure formed by the block-plate 2 at its lower conical surface 2a houses a parachute (not shown). The upper surface 2 may be pivotally mounted and provided with a mechanism (not shown) to spring open under control of the pilot for the purpose of ejecting the chute so it may open and allow the vehicle to drop safely to the ground.

As shown in FIGURE 1b, the supporting structure 28 may be provided with a plurality of wheels 45 secured to the supporting ribs 34, 35 and the tracks 31 for the purpose of enabling conventional operation along the ground. A suitable gearing mechanism (not shown) may be employed for the purpose of coupling the operation of engine 9 to the wheels 45, or at least two of them, to move the vehicle along the ground. If desired, the wheels 45 may be omitted, and a fixed cradle frame or skids may be employed. In addition thereto, flotation gear of any conventional manner may be secured to the under-carriage to enable landing upon water as well. Operation of the vehicle, when provided with wheels 45, may be carried out by means of suitable controls provided in the cockpit area 18.

FIGURE 1d shows the manner in which the cooperating elements of the aircraft may be positioned and supported. For example, the wing sections 1 and 5 and the platform 3 may be rigidly supported by vertical rods 55 which are provided with coupling elements 56 which may, for example, be threadedly engaged by rods 55 and be positioned above and below each of the structures 1, 3 and 5 to firmly maintain relative spacing between the elements. Alternatively, each of the elements 1, 3 and 5 may be welded at the locations 56 in the case where the elements 1, 3 and 5 are metallic members. Obviously, any other suitable fastening schemes may be employed to secure the elements 1, 3 and 5 to the supporting rods 55 which, although not shown, are preferably arranged in pairs aligned in radial fashion about the entire assembly. The base plate 28 may be secured to the supporting rods 55 in a similar manner.

Figure 2:
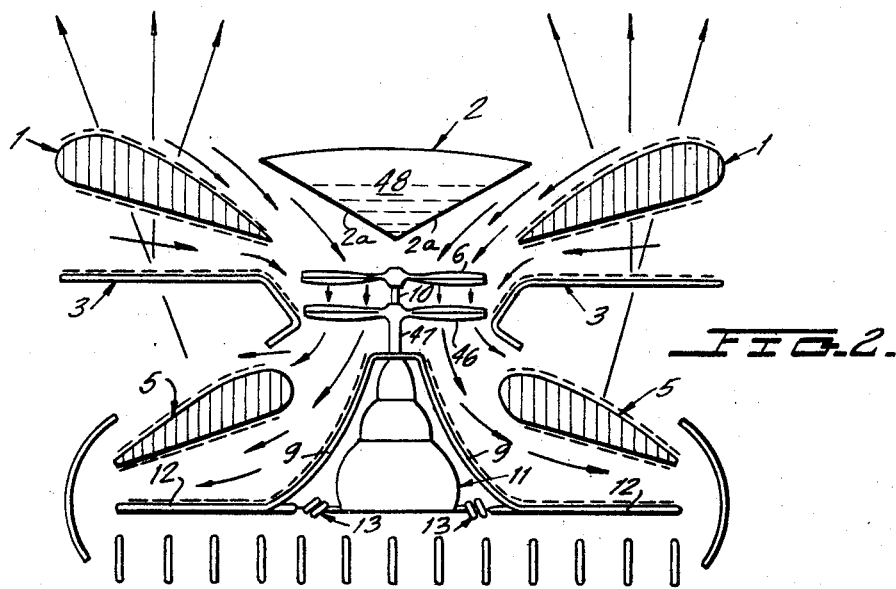
FIGURES 2 and 3 are elevational sectional views showing other preferred embodiments of the instant invention.

FIGURE 2 shows an alternative embodiment for the instant invention which employs counter-rotating propellers 6 and 46. Propeller 6 is coupled to the engine by means of shaft 10, while propeller 46 is coupled to the engine by means of a hollow tubular shaft 47 which surrounds solid shaft 10. The counter-rotating propeller scheme of FIGURE 2 counteracts the torque of the engine, as well as enhancing lift for the vehicle.

As shown in FIGURE 2, the fuel for the vehicle may be stored in a tank 48 which is contained within the housing comprised of the air-block plate 2 and its lower tapered walls 2a. The fuel may be fed by any suitable conduit (not shown) to the engine. As an alternative arrangement shown in FIGURE 1, the fuel tanks 21 may be contained within the trailing edge portion of lower wing 5. In addition thereto, the fuel tank may be located immediately below the engine 9 and above the engine base plate 14.

Figure 3:
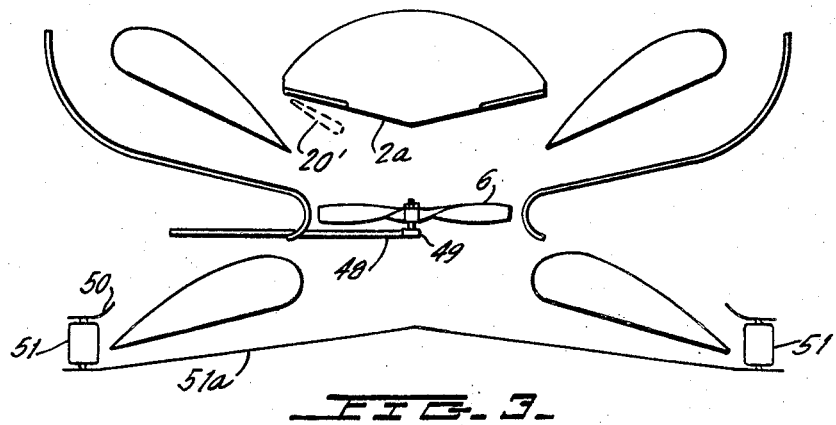

FIGURE 3 shows still another alternative embodiment wherein the engine need not be vertically mounted nor positioned at the center of the vehicle, as shown in FIGURES 1 and 2. If desired, the engine may be mounted along the supporting structures 34, 35 of FIGURE 1a, and be coupled to the propeller 6 by means of a horizontally aligned coupling drive shaft 48 which is mechanically coupled to the output shaft of the engine (not shown), and which is provided with suitable mechanical means at 49 for linking the rotational drive of the motor to the propeller 6.

FIGURE 3 shows the extendable spoilers secured to the underside of the tapered walls 2a and arranged to pivot downwardly and inwardly, as shown by the dotted line spoiler 20', for the purpose of decreasing the drag of the vehicle. The tapered housing wall 2a forms an angle of 8° with the horizontal to provide a 12° angle of constant air attack.

In the embodiment shown in FIGURE 3, the exhaust scoop air-collector 13 of FIGURE 1 is replaced by an annular-shaped air-collector 50 spaced above a circular-shaped base plate 510 having a conical taper and which is provided with a plurality of pivotally mounted side dispersal vanes 51, 51 for the purpose of controlling side directional movement of the vehicle.

As can best be seen in FIGURES 1 and 2, the upper and lower wings 1 and 5, respectively, are aligned at an angle of approximately 12° to a horizontal line to provide a constant angle of attack. Due to the complementary arrangement of their leading and trailing edges, their vector lines 42 and 43, as shown best in FIGURE 1, cooperate to exactly balance the horizontally disposed vector component of each to balance one another and thereby yield a resultant vector 52, 52 which is directed vertically upward and which represents the resultant lift imposed upon the vehicle. The cooperative effects of the vehicle ductwork and the complementary arrangement of the angles of attack cause the air to enter in a peripheral manner from the top side and to pass over the top wing creating a low-pressure area 54 and a high-pressure area 55 on the top and bottom sides of top wing 1. The air then enters into the region of the propeller and is directed outwardly and downwardly by the ductwork and air reversal torque vanes 16 so as to pass wing 5, creating a low-pressure area 56 and a high-pressure area 57 above and below the wing surfaces, respectively. This creates a lift of the vehicle. The built-in angle of attack, or angle of the lower wing, it is not exhausted but is collected and deflected by the air-collector 13 so as to enter a chamber 17 which permits exhausting of the air through pivotally mounted vanes 15 and 15a for sidewise directional movement of the vehicle, or for further enhancement of the lift of the vehicle. The built-in angle of attack, or angle of incidence of the wings 1 and 5 create the major lift for the vehicle, although engine upper thrust should be considered as lift.

FIGURE 4a shows a slightly modified version of FIGURES 1 through 1d and 2 wherein a pair of wings 1 and 1' are employed in place of the angle upper wing section 1 of FIGURES 1 and 2, for example. The leading edges of wing sections 1 and 1' are both arranged at the upper portion of the air frame in order to jointly cooperate to provide lift in place of the single wing section 1 of FIGURES 1 and 2. The modified arrangement of FIGURE 4a is further provided with a pair of separation ducts 61 and 62, respectively, each of which are provided with an annular-shaped slot 61a and 62, respectively, which provides clearance for the outer ends of propeller blades 1 and 10', respectively, which annular slots eliminate any back pressure to prevent any reverse airflow which would tend to reduce the lift. In the alternative embodiment of FIGURE 4a, the propellers 10 and 10' are provided with separate engines 9 and 9', each positioned above its associated propeller in the manner shown. Obviously, a consolidated engine arrangement, as shown in FIGURE 2, may be employed, if desired. While both propellers are designed to draw air inwardly and downwardly, the propellers are preferably arranged to be counter-rotating to eliminate torque problems, as well as providing added thrust and a larger volumetric movement of air. The dual wings 1 and 1' have their leading edges arranged at their outer periphery, as was previously mentioned, which serves to make the airflow much more direct than in previous embodiments. As shown in FIGURE 4a, arrows 63 and 64 indicate airflow above each wing section 1 and 1', while arrows 65 and 66 indicate the direction of airflow beneath each wing section. All airflow converges in the region of the counter-rotating propellers to be driven downwardly, as shown by arrows 67, which airflow may then be directed outwardly above and below a lower wing section, such as the wing section 5 shown in FIGURE 2, for example, or may alternatively be collected and directed out of an air-collection chamber, as shown in FIGURE 4b, which further includes an air-collection chamber defined by the upper housing 68 whose lower portion is open and is provided with a plurality of down-draft vanes 69 and 70 arranged at right angles to one another and pivotally mounted so as to be movable between a fully open position (as shown in FIGURE 4b) and a fully closed position. The angular orientation of the vanes may be selected to provide for movement of the aircraft vehicle in any desired direction. For example, when all of the vanes 69 and 70 are aligned in the positions shown in FIGURE 4b, the movement of the aircraft will be directly upward. Slight angular orientation of the vanes off-set from the vertical direction will cause the aircraft to move in a sidewise direction, depending upon the angular orientation selected.

FIGURES 5a and 5b show still another alternative embodiment of the present invention, which is a single wing embodiment. As shown in FIGURES 5a and 5b, this embodiment is comprised of a single toroidal-shaped wing 1 whose leading edge 1a is directed inwardly. An annular-shaped propeller intake flange 71, which has a substantially semicircular cross-sectional configuration, is further provided with an annular groove 72 which receives and provides adequate clearance for the ends of the blades of propeller 6. The propeller is driven by engine 9 located below propeller 6, and is surrounded by a substantially conical-shaped engine cone 73. An outer air-collection flange 74 surrounds wing 1, and has its upper interior edge 74a positioned above the trailing edge 1b of wing 1. The lower and outer edge of member 74 is coupled to an air collection chamber which may be of the type shown in FIGURE 4b, for example.

Airflow through the aircraft of FIGURES 5a and 5b is as follows:

The rotating propeller 6 draws air inwardly over the curved section of flange 71, as shown by arrows 75. The air passes through the region of the rotating propeller 6, and is deflected downwardly and outwardly by engine cone 73 so as to pass above and below wing 1, as shown by arrows 76 and 77, respectively. The air passing above wing 1 is deflected downwardly by the air-collection housing 74, as shown by arrows 78. The air passing beneath wing section 1 is likewise deflected downwardly, as shown by arrows 79, to be collected in the air-collection chamber for further deflection by a vane structure of the type shown in FIGURE 4b, for example.

Air is also enabled to pass through the opening between the top of engine cone 73 and engine 9, as shown by arrows 80, to provide for cooling of the engine during operation. The orientation of the air-collection chamber vanes, as shown in FIGURE 4b, controls the direction of flight of the aircraft, i.e., straight up, sidewise, or any combination thereof.

Figure 7:
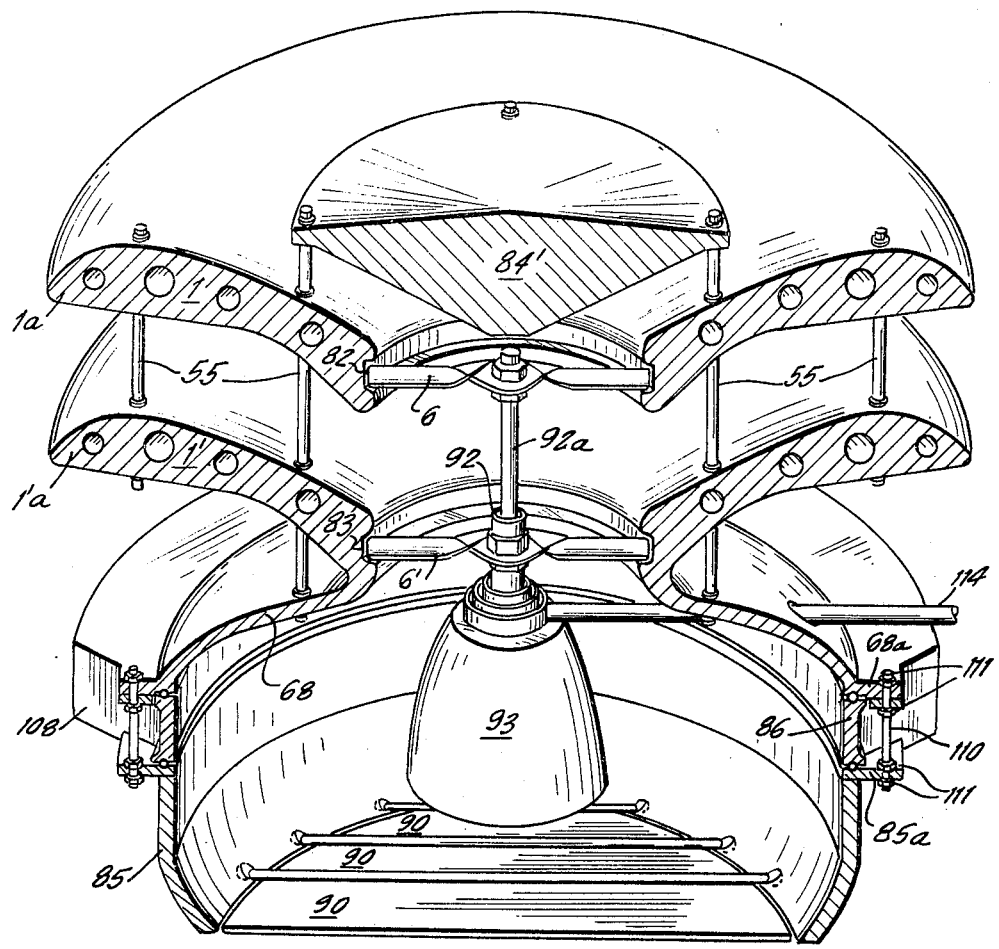
FIGURE 7 is a perspective view showing a twin propeller drive which is a slightly modified form of the embodiment of FIGURE 6.

FIGURES 6 and 7 are perspective views showing alternative embodiments of the present invention which most closely resemble the embodiment of FIGURE 4b. The embodiment of FIGURE 6 is comprised of a pair of wing sections 1 and 1', each having their leading edges 1a located at the outer end of each wing section. The wing sections 1 and 1' and the air-collection chamber housing 68 are all positioned and supported by rigid supporting rods 55 which may be secured to each of the elements 1, 1' and 68 by threaded fastening members, welding, or any other suitable fastening technique.

Wings 1 and 1' are each provided with annular grooves 82 and 83 which receive and provide adequate clearance for the outer ends of the blades of propellers 6 and 6' respectively. As was previously mentioned, the grooves 82 and 83 prevent any back pressure which may cause a reduction in lift of the aircraft. A conical-shaped member 84 having a substantially curved surface is secured to upper wing section 1 by means of ribs 85 forming a spider assembly. Conical-shaped shield 84 prevents air from being pulled downwardly through the aircraft without being pulled over the upper edge of wing section 1. The lower portion of wing 1' curves downwardly and outwardly at 84 where it is joined to the air-collection chamber housing 68. It should be noted that there is no airflow over the base of wing 1. The lower housing portion 85 of the air-collection chamber is a substantially circular member whose uppermost edge confronts the lowermost edge of top housing portion 68 between which is mounted an air-dispersal selector ring 86 which rides on bearings 87 and 88 respectively positioned between the lower edge of housing 68 and the upper edge of ring 86, and the upper edge of housing 85 and the lower edge of ring 86.

A plurality of down-draft vanes 90 have their opposite ends journaled within suitable bearings 91 provided at spaced intervals around the lower interior edge of lower housing 85 to enable rotational movement of the vanes (shown in FIG. 6 in the open position) for controlling the amount of lift experienced by the vehicle. These vanes are open during hover for bleed off or lift on takeoff, closd on flight and air is dispersed through exhaust tube shown in FIGURE 7 as 108. Three exhaust tubes are closed on flight and air is dispersed through exhaust tube The aircraft power plant or engine 9 is centrally located and drives a first and a second shaft 92 and 92a for respective rotation of propellers 6' and 6, which are arranged to be counter-rotating so as to overcome any torque problems. Shaft 92 is a hollow tubular-shaped shaft to permit passage of shaft 92a therethrough. The engine is surrounded by an engine-cooling cowling 93 which provides the interior region between engine 9 and cowling 93 to permit the passage of air therethrough for cooling of the engine during operation.

Airflow through the embodiment of FIGURE 6 is as follows:

Operation of the counter-rotating propellers causes air to be drawn inwardly above and below wing section 1, as shown by arrows 94 and 95, respectively. The air passing above wing section 94 is deflected downwardly, as shown by arrows 96, to pass through the region occupied by propeller 6. The rotation of propeller 6' draws air inwardly above wing section 1', as shown by arrows 97, which air, in turn, is drawn through the region occupied by propeller 6' to move substantially vertically downwardly, as shown by arrows 98. Downwardly moving air is collected within the interior of the air-collection chamber, some of which air passes in the region between the interior of cowling 93 and the exterior scan of engine 9, as shown by arrows 99. This movement of air acts to cool the engine during operation.

As was previously described, the air collected within the air-collection chamber is caused to selectively pass out of the chamber either through vanes 90 whose angular orientation controls the downward movement of the air, or through the exhaust openings.

Directional movement of the vehicle is controlled by the air-dispersal selector ring shown in two alternative forms in FIGURES 8 and 9, respectively. Considering FIGURE 8 initially, the air dispersal-selector ring 86 is comprised of an arcuate-shaped section continuous along its circumferential surface, with the exception of the open portion located between the outermost end of supporting braces 101 and 102. In the embodiment of FIGURE 8, the selector ring is further supported about a pivot point 103a by means of bracing members 101 and 102 and further bracing member 104. A shaft 105 passes through and is rigidly secured to collar 103 to provide for rotation of the air-dispersal selector ring. The upper and lower housings (68 and 85 in FIGURE 7, for example) may be provided with outwardly extending flanges 68a and 85a, respectively, for receiving threaded rods 110 and fastening members 111 for securing the housing sections to one another in a spaced parallel fashion, and further providing for retaining the dispersal ring 86 in position between the housing sections, while, at the same time, allowing for its angular rotation. The fastening members further provide securement for the exhaust tubes 106 through 109 (only two of which are shown in FIGURE 7) which allow for the dispersal of air in a sidewise fashion. The eyelets provided for bolting sections of the housings are shown at 112 in FIGURE 8.

The operation of the aircraft employing an air-dispersal ring is as follows:

During either hovering or vertical take-off, the vanes 90 (shown in the fully closed position in FIGURE 8) are open so as to be positioned in the vertical direction, as shown best in FIGURE 6. During flight, the vanes may be either slightly open or fully closed. When fully open, substantially all of the air will pass downwardly as it exits the aircraft. However, when the vanes are either slightly open or fully closed, the air being substantially captured within the interior of the air-collection chamber is caused to exit through one of the exhaust tubes 106 through 109, depending upon the positioning of the air-dispersal selector ring. As shown in FIGURE 8, for example, the air will pass through the exhaust tube 106, causing the aircraft to travel in the direction shown by arrows 113 of FIGURE 8. Movement of the air-dispersal selector ring to any other position will alter the direction of sidewise flight of the aircraft. Although the open section of the air-dispersal selector ring may be positioned so as to exactly coincide with an exhaust tube opening, it should further be understood that the air-selector ring open section may straddle portions of two adjacent exhaust tubes to thereby provide sidewise flight in any desired direction.

For travel over or upon water, all of the vanes 90 may be closed to provide surface propulsion while the air exhausts from one or more of the exhaust tubes, causing the vehicle to experience sidewise travel (i.e. travel in a horizontal direction). Coupling of rotational drive to the air-dispersal selector ring may be provided for through a horizontally aligned coupling member 114, shown in FIGURE 7, which passes through a suitable opening in upper housing section 68 to be coupled to shaft 105, shown in FIGURE 8, in any suitable manner.

The embodiment of FIGURE 7 is substantially the same as that shown in FIGURE 6, with the exception of the provision of a slightly modified air-blocking member 84' which is coupled to the aircraft supporting rod 55 in the manner shown, as opposed to the manner in which shield 84 is coupled by the spider assembly 85 of FIGURE 6. The remaining structure of the embodiment of FIGURE 7 is quite similar to that shown in FIGURE 6 wherein like numerals designate like structural elements.

FIGURE 9 shows a slightly modified embodiment of the air-dispersal selector ring of FIGURE 8, and is comprised of a pillow-block bearing 120 rigidly secured to shaft 105. The pillow-block bearing 120 is free to rotate relative to shaft 103, and is rotatably driven by a suitable gear means (not shown) which meshes with a cog 121 provided at the lower edge of the pillow-block bearing. A pair of supporting ribs 122 extend outwardly from the top and bottom ends of the pillow-block bearing and are secured to the interior surface of the ring 124 which is provided with an opening defined by the edges 124a and 124b of ring 124, as well as additional bracing members 125–125a and 126–126a which rigidly brace and secure the edges 124a and 124b of ring 124 to the pillow-block bearing 120. Sidewise movement of the aircraft is obtained in the same manner as was previously described by aligning the opening provided within the ring with one of the exhaust tubes 106 through 109, shown in FIGURES 7 and 8, for example, or by causing the opening to straddle a portion of two adjacent exhaust tubes, if desired.

FIGURE 10 shows still another preferred embodiment of the instant invention, and is comprised of upper and lower wing sections 1 and 1' having their leading edges 1a and 1a', respectively, arranged along their outer peripheral ends. The embodiment of FIGURE 10 somewhat resembles the embodiment of FIGURE 4a in that counter-rotating propellers 6 and 6' are provided, each having their engines 9 and 9' arranged immediately above their associated propellers. Each of the wing sections are further provided with annular groove slots 61 and 62 for receiving and providing sufficient clearance for the outer ends of their associated propellers 6 and 6' in order to reduce back pressure during flight. In the embodiment of FIGURE 10, low pressure areas are created above each airfoil 1 and 1' due to the airflow represented by arrows 130 and 131, respectively. However, the airflow represented by the numerals 132 and 133 beneath each wing section 1 and 1', respectively, is not utilized and is strictly at atmospheric pressure or at a higher pressure than the airflow above each wing section. This principle has been found to provide extremely high lift properties, and is extremely advantageous for use in the aircraft described herein. For example, the twin wing embodiment of FIGURE 10 may further be combined with a lower wing having its leading edge along its interior periphery, as shown in FIGURE 1, for example, or may alternatively be combined with an air-collection chamber of the type shown in FIGURE 6 or 7, for example.

The propellers 6 and 6' are designed to be counter-rotating so as to correct for any torque problems in the same manner as was previously described.

Although a piston-type engine is suggested in here as the preferable driving means for the vehicle, it should be understood that any other form of engine may be employed, such as a jet engine or a regular piston-type engine utilizing an impeller, a propeller, ducted fans, or any combination thereof.

It can be seen from the foregoing, that the instant invention provides a novel air-ground vehicle having a unique single or multiple-wing arrangement of upper and lower wings having built-in angles of attack and each being of substantially annular-shape for providing a constant upward lift, and further providing means for preventing exhausting air from immediately leaving the vehicle proper and passing through suitable dispersal openings having pivotally mounted vanes for providing sidewise movement of the vehicle, thereby allowing the vehicle to travel in any conceivable direction, either upwardly, downwardly sidewardly, or any combination thereof. A variety of means are deployed for the purposes of effecting front-to-back trim either directly under the control of the pilot or for automatic operation thereof. The vehicle may be provided with any suitable landing chassis such as wheels, skids, flotation gear, or any combination thereof. Suitable mechanical means may be provided for coupling the engine normally driving the vehicle propeller to the wheels for permitting conventional ground travel under control of a pilot seated in the cockpit area.

Although this invention has been described with respect to its preferred embodiments, it should be understood that many variations and modifications will now be obvious to those skilled in the art, and it is preferred, therefore, that the scope of the invention be limited not by the specific disclosure herein.

What is claimed is:

1. A vehicle for air and/or ground travel comprising:
    an upper and a lower annular-shaped wing; each of said wings having an airfoil-shaped cross-section; the outer periphery of said upper wing being the leading edge of the airfoil and the inner periphery of said upper wing being the trailing edge of the airfoil;
    the inner periphery of the lower wing being the leading edge of the airfoil and the outer periphery of the lower wing being the trailing edge of the airfoil;
    the upper wing being positioned a predetermined distance above the lower wing;
    the center of gravity of both wings being coincident with the geometric center of each wing and being coincident with an imaginary vertical line forming the center of gravity of the vehicle;
    first means positioned along the imaginary center line for drawing air toward the center of the vehicle;
    duct means for guiding the flow of the inwardly drawn air to pass the upper wing and to be deflected downwardly and outwardly to pass the lower wing;
    annular-shaped air-collection means generally surrounding the trailing edge of the lower wing; a base plate positioned beneath the lower wing and having its outer periphery joined with the lower edge of said air-collecting means to define an air-collection chamber beneath said lower wing;
    pivotally mounted louvers arranged in openings provided in said base plate for deflecting the flow of air exhausted from said chamber to control the sidewise or vertical movement of said vehicle;
    both said upper wing and said lower wing having their leading edges positioned above their trailing edges to define a constant angle of attack for providing a resultant upward lift.

2. The vehicle of claim 1 wherein said first means is comprised of a vertically aligned engine having its longitudinal axis coincident with the said imaginary center line; said engine having a rotatable output shaft; propeller means secured to said output shaft.

3. The vehicle of claim 1 further comprising a circular-shaped air blocking plate arranged concentric with the imaginary center line and positioned a spaced distance above the upper wing to cause the inwardly flowing air to enter the vehicle in a sidewise manner toward the center of the vehicle.

4. The vehicle of claim 3 wherein said duct means is further comprised of an annular-shaped upper platform duct having its center coincident with said imaginary center line and being positioned between said upper and lower wings to define a region between the lower surface of said upper wing and the upper surface of said platform duct for guiding inwardly flowing air therethrough.

5. The vehicle of claim 4 wherein the duct means is still further comprised of a substantially conical-shaped hollow member surrounding and concentric with said first means for reversing the direction of and deflecting inwardly flowing air so as to pass the lower wing.

6. The vehicle of claim 5 wherein said conical-shaped hollow member is provided with openings at its upper and lower ends to enable a portion of the inwardly flowing air to pass downwardly over said first means and into said air-collection chamber for cooling said first means.

7. The vehicle of claim 1 further comprising:
    a supporting platform having a substantially U-shaped configuration;
    the central portion of said supporting structure having a longitudinal axis coincident with a diameter of said wings;
    first and second arms each extending in a first direction substantially perpendicular to the longitudinal axis of said central portion;
    an additional supporting structure secured to said central portion at a point intermediate the ends thereof and extending outwardly therefrom in a direction opposite the direction of said first and second arms;
    a cockpit assembly being mounted on the distal end of said additional supporting structure beyond the outer periphery of said wings.

8. The vehicle of claim 7 wherein:
    each of said first and second arms is provided with a pair of tracks;
    first and second movable counterweights being arranged to slide along said tracks for adjusting the front-to-back trim of said vehicle;
    means located within said cockpit area mechanically linked to said counterweights for manually adjusting the front-to-back trim of said vehicle.

9. The vehicle of claim 1 wherein said first means is comprised of motor means for driving first and second output shafts concentric with one another, said first shaft being driven to rotate in a first direction; said second shaft being a tubular shaft surrounding said first shaft and being coupled to the motor to be rotated in the second direction opposite said first direction; first and second propeller means coupled respectively to said first and second shafts.

10. The vehicle of claim 1 further comprising supporting undercarriage means for supporting said vehicle; wheel means rotatably mounted to said undercarriage means for moving said vehicle along ground terrain.

11. The vehicle of claim 10 further comprising means mechanically linking said first means to said wheel means for moving said vehicle along said ground terrain.

12. The vehicle of Claim 1 further comprising anti-torque vanes mounted on said duct means for reversing the direction of flow of air said upper wing toward said lower wing.

13. The vehicle of claim 4 wherein at least said upper platform is provided with a plurality of pivotally mounted spoilers arranged at discrete positions around said platform means; means controlled by the pilot of said vehicle being coupled to said spoilers for providing trim of the aircraft.

14. The vehicle of claim 4 wherein at least said upper platform is provided with a plurality of pivotally mounted spoilers arranged at discrete positions around said platform means; sensing means operative upon an inbalance in weight distribution of said vehicle for automatically operating said spoilers to trim said aircraft.

15. The vehicle of claim 14 further comprising means coupled to said spoilers for defeating the operation of said sensing means and placing the spoilers under manual control.

References Cited

UNITED STATES PATENTS

| | | | |
|---|---|---|---|
| 3,034,747 | 5/1962 | Lent | 244—23 |
| 2,990,137 | 6/1961 | Willis | 244—12 |
| 3,181,811 | 5/1965 | Maksim | 244—12 |

MILTON BUCHLER, Primary Examiner

T. W. BUCKMAN, Assistant Examiner

U.S. Cl. X.R.

244—93